United States Patent [19]

Matthews

[11] Patent Number: 5,241,572
[45] Date of Patent: Aug. 31, 1993

[54] APPARATUS FOR LOCATING A FLOATABLE PLATFORM

[75] Inventor: Harry Matthews, Wrosley, England

[73] Assignee: British Nuclear Fuels Plc, Warrington, United Kingdom

[21] Appl. No.: 870,330

[22] Filed: Apr. 17, 1992

[30] Foreign Application Priority Data

May 31, 1991 [GB] United Kingdom ............... 9111680

[51] Int. Cl.⁵ .................. G21C 19/07; B63C 11/00; E02C 5/00
[52] U.S. Cl. .................................. 376/272; 405/196; 405/200; 405/205; 405/224; 114/230; 114/264
[58] Field of Search ............... 376/272, 287; 405/3, 405/196, 200, 205, 208, 224; 114/44, 230, 264, 265, 293, 294, 295

[56] References Cited

U.S. PATENT DOCUMENTS

| 3,874,180 | 4/1975 | Sumner | 405/224 |
| 4,254,730 | 3/1981 | Crenshaw | 405/208 |
| 4,426,173 | 1/1984 | Richart et al. | 405/195 |
| 4,762,442 | 8/1988 | Thomas et al. | 405/224 |
| 4,963,058 | 10/1990 | Broughton et al. | 405/205 |

FOREIGN PATENT DOCUMENTS

| 0085616 | 8/1983 | European Pat. Off. |
| 947918 | 1/1964 | United Kingdom |
| 1217827 | 12/1970 | United Kingdom |
| 1372174 | 10/1974 | United Kingdom |

Primary Examiner—Daniel D. Wasil
Attorney, Agent, or Firm—William R. Hinds

[57] ABSTRACT

Apparatus for locating a floatable platform, comprises upstanding support members arranged to be adjacent to an article submerged in a liquid, and extendible members depending from the platform. The extendible members on initial extension are arranged to locate on the support members, and further extension of the extendible members raises the platform from a buoyant to a partially-buoyant state. A laser device on the platform is arranged to scan a stationary coded target so as to determine the position of the platform.

8 Claims, 5 Drawing Sheets

APPARATUS FOR LOCATING A FLOATABLE PLATFORM

This invention relates to apparatus for locating a floatable platform, and more particularly, but not exclusively, concerns a platform for monitoring multi-element bottles (MEB's) as used for storing irradiated nuclear fuel elements under water in a storage pond.

According to one aspect of the present invention there is provided apparatus for locating a floatable platform relative to an article submerged in a liquid, the apparatus comprising support members arranged to be adjacent to the article, extendible members depending from the platform, the extendible members being locatable on the support members such that appropriate extension of the extendible members raises the platform from a buoyant to a partially-buoyant state, means for determining the position of the platform relative to the article, inspection means for inspecting the article, and a leg on which the inspection means is mounted, the leg being supported from the platform and being capable of extending below the platform.

Preferably, the extendible leg is supported from a carriage, and the carriage locates on and is movable on first guide means which themselves locate on and are movable on second guide means disposed on the platform and aligned in a direction normal to the first guide means, thereby to provide x-y scanning of the inspection means.

According to another aspect of the present invention, apparatus for locating a floatable platform relative to an article submerged in a liquid, comprises support members arranged to be adjacent to the article, extendible members depending from the platform, the extendible members being locatable on the support members such that appropriate extension of the extendible members raises the platform from a buoyant to a partially-buoyant state, means for determining the position of the platform relative to the article, the position determining means comprising laser means on the platform arranged to scan stationary coded targets remote from the platform, and a rack in which the support members are incorporated and in which rack the article is locatable.

In accordance with a further aspect of the present invention, there is provided apparatus for locating a floatable platform relative to an article submerged in a liquid, comprising support members arranged to be adjacent to the article, extendible members depending from the platform, the extendible members being locatable on the support members such that appropriate extension of the extendible members raises the platform from a buoyant to a partially-buoyant state, means for determining the position of the platform relative to the article, a rack in which the support members are incorporated and in which rack the article is locatable, the article comprising a container for irradiated nuclear fuel.

The invention will now be further described, by way of example only, with reference to the accompanying drawings in which.

Figure 1:
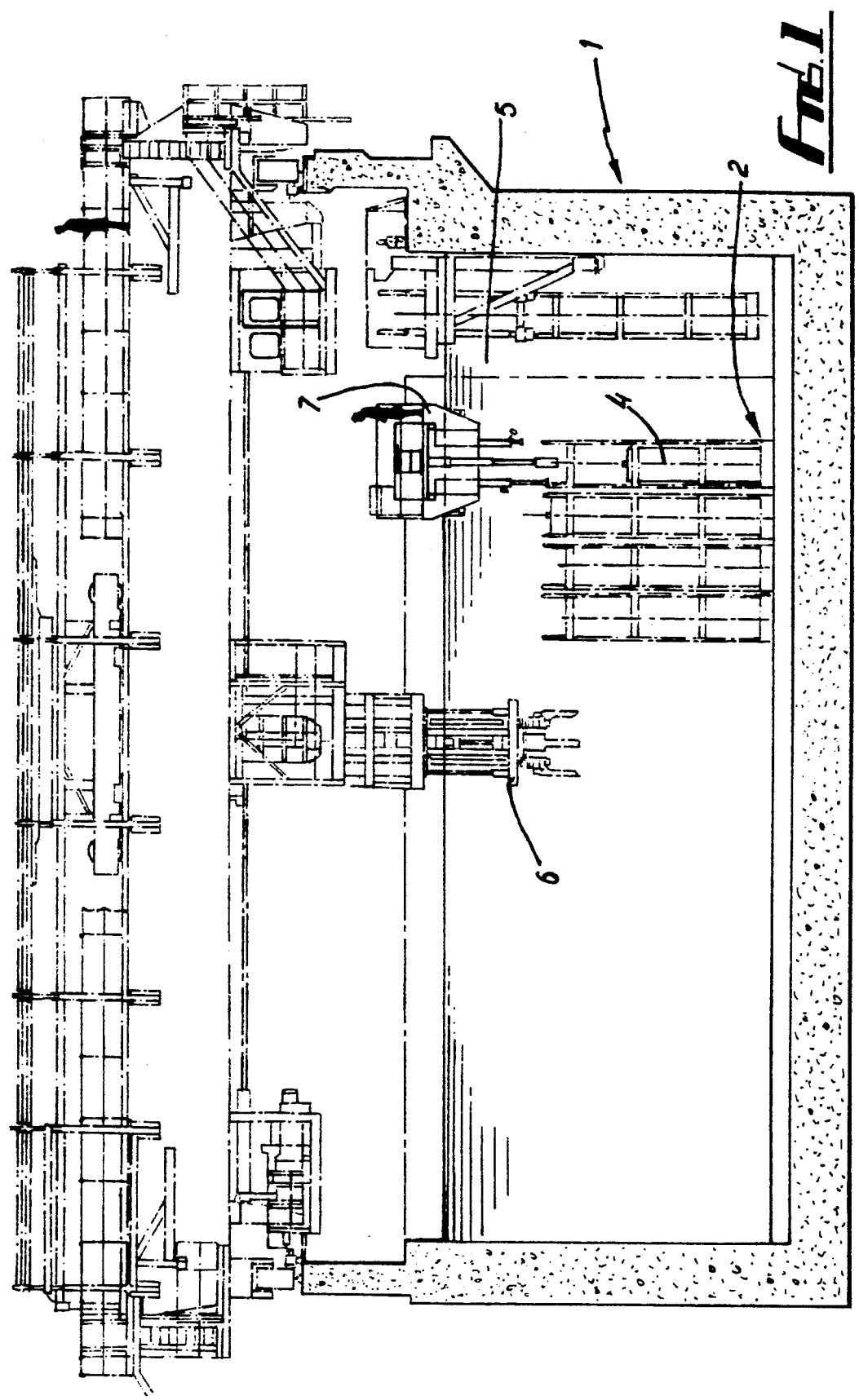
FIG. 1 is a sectional representation of part of a storage pond system for receiving MEB's.
Figure 2:
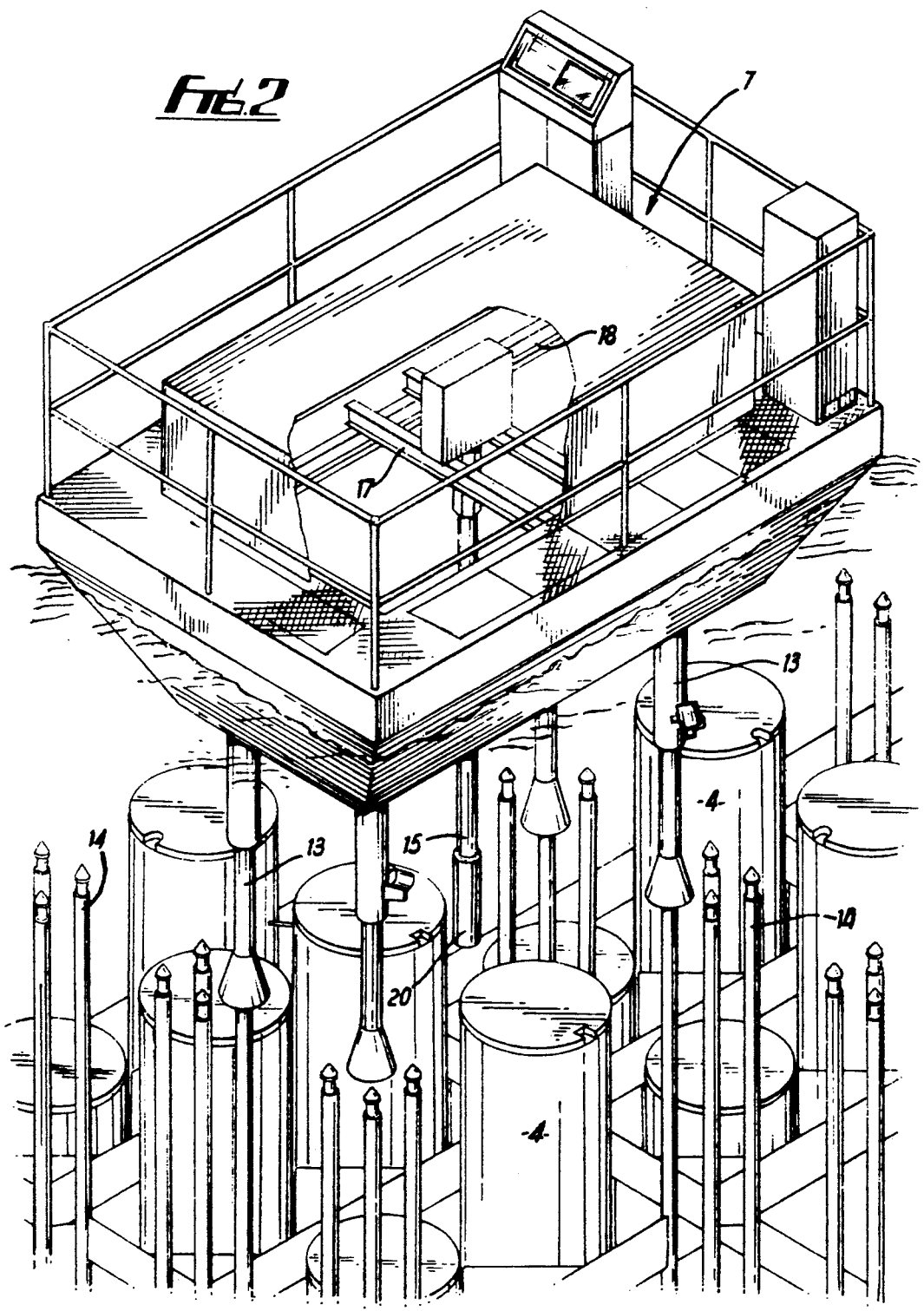
FIG. 2 is a perspective representation of apparatus according to the invention.
Figure 3:
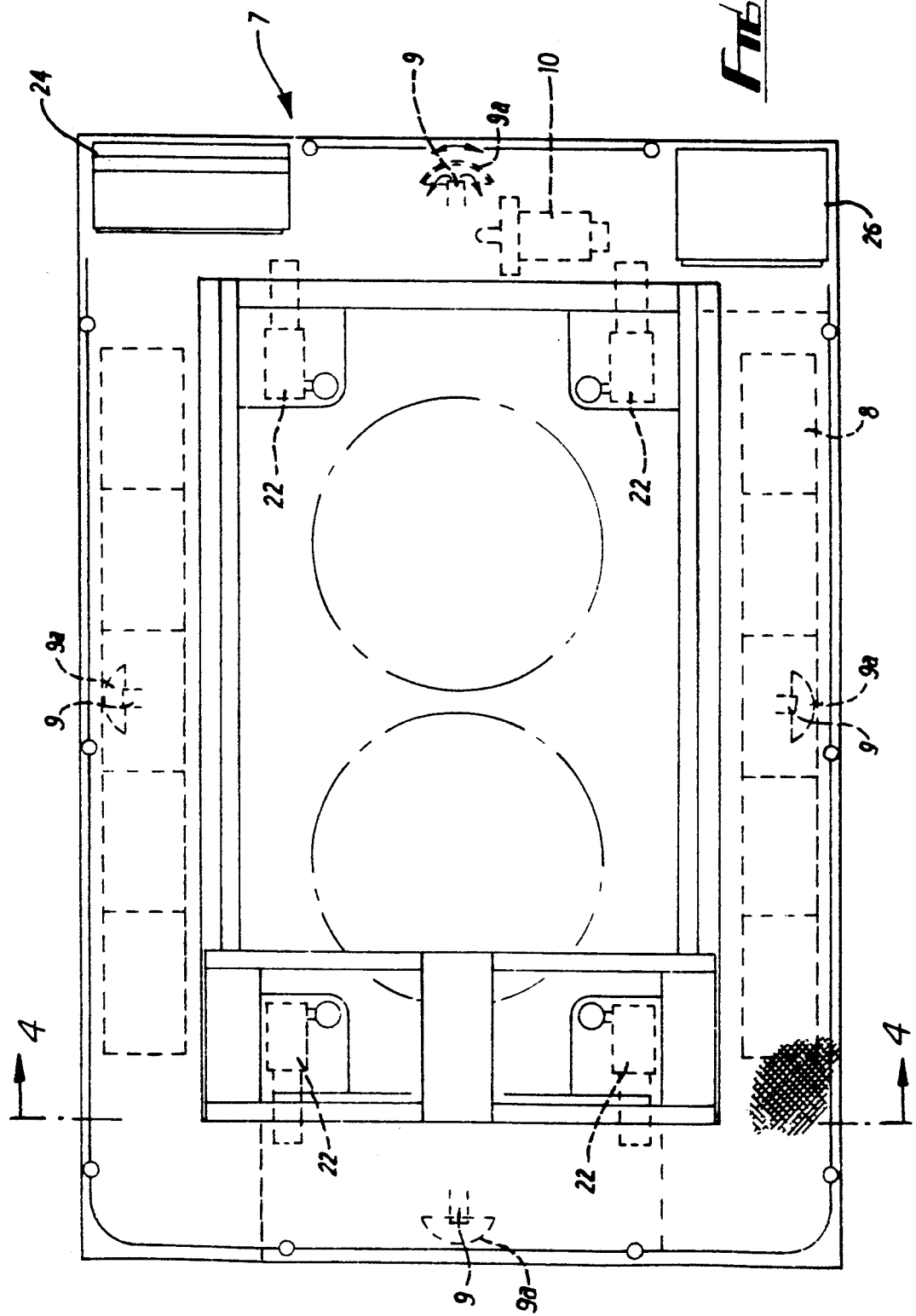
FIG. 3 is a plan view of the apparatus of FIG. 2.
Figure 4:
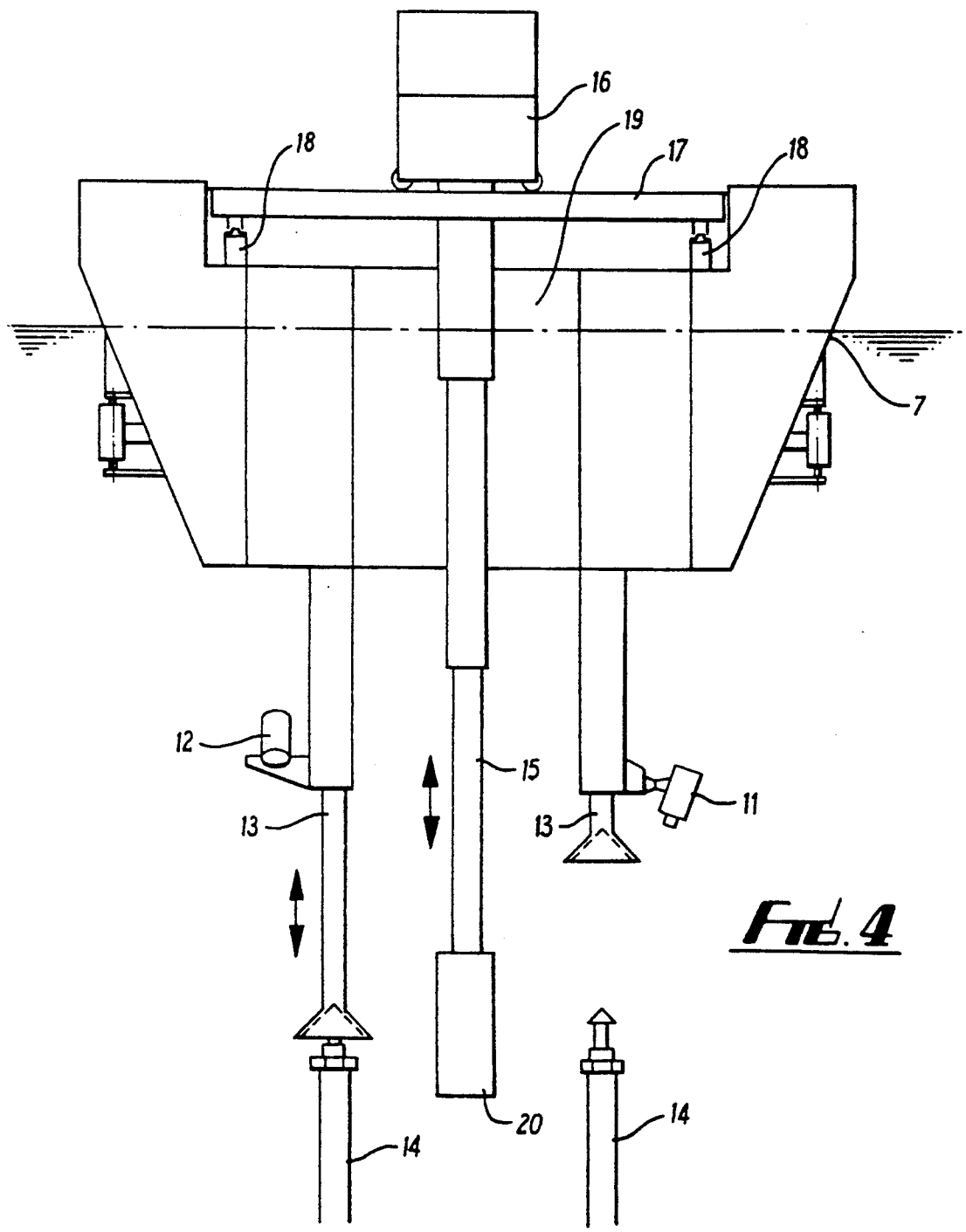
FIG. 4 is a view on the line 4—14 in FIG. 3.

With reference to FIGS. 1 to 4, in a storage pond system 1 a plurality of racks 2 to receive MEB's 4 (multi element bottles) are submerged under pond water 5. The racks 2 containing MEB's 4 are transported and positioned within the storage pond 1 by a known pond handler 6.

It is required to monitor the condition of the submerged MEB's 4 and for this purpose there is provided a floating platform 7. The platform 7 is radio controlled and powered by batteries which are located in compartments 8 on the platform 7, and has a remote control panel 24 and a data processing unit 26. Propulsion is by means of water jets 9 located below the level of the pond water 5 on each side or face of the platform 7. A propulsion pump 10 delivers pond water 5 to the jets 9, and shaped deflector plates 9a on the jets 9 provide manoeuvrability. Man access to the platform 7 is available for an on-board control option.

The position of the platform 7 within the pond system 1 can be determined by an on-board laser (not shown in FIGS. 1 to 4) which can scan bar coded targets on the pond wall. Its position so determined is transmitted through a radio link to a remote control station in a control room. The platform 7 position can be displayed superimposed on a plan of the pond system 1. An operator can steer the platform 7 to a desired rack 2 location by means of the display. An underwater television camera 11 and floodlights 12 mounted on the platform 7 assist the operator during final positioning over the rack 2.

An anti-collision device can be provided to warn operators when the pond handler and the platform 7 approach within a certain distance of one another.

With the platform 7 positioned over the rack 2 four telescopic legs 13 extending from the underside of the platform 7 and having conical ends are lowered by drive units 22 to anchor and locate on rack pintles 14 and thereby lift the platform 7 into a partially buoyant position to provide a stable support for a scanning operation of the MEB 4 in the rack 2.

A monitoring probe 20 is fixed to a telescopic leg 15 and is lowered to a set distance above the top of the MEB 4. To provide x-y scanning, the telescopic leg 15 is supported from a carriage 16 which runs on a rail assembly 17 in the 'x' direction. The rail assembly 17 is likewise supported on rails 18 at opposite sides of a control opening 19 in the platform 7 to provide movement in the 'y' direction. Interlocks can be provided to prevent movement of the platform 7 during monitoring of the MEB 4.

Figure 5:
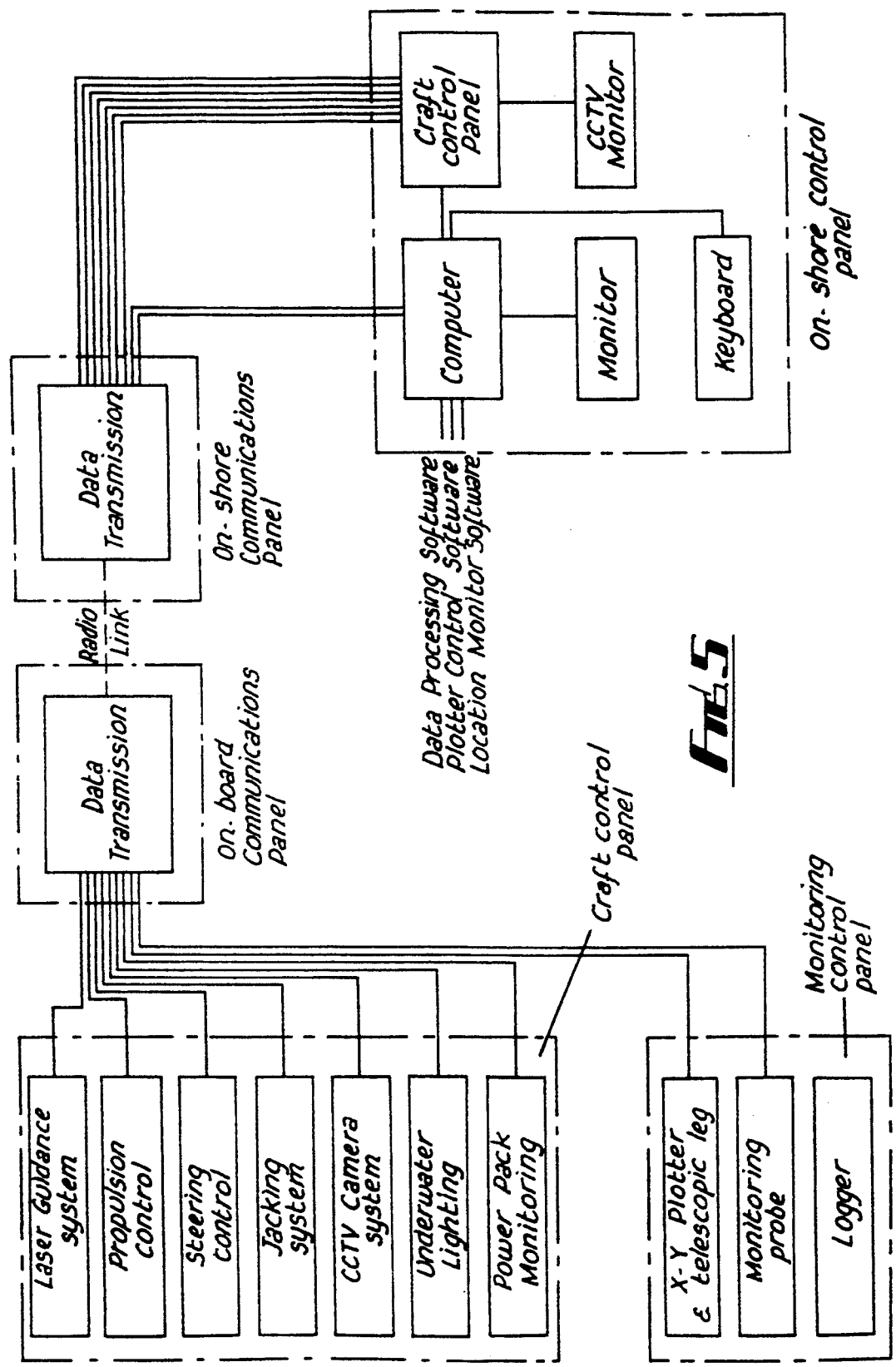
FIG. 5 is a block diagram of a control arrangement for the apparatus of FIG. 2.

Data from the monitoring probe 20 can be transmitted to a remote control station by a radio link (see FIG. 5). A back-up recording of the transmitted data can be stored on the platform 7. Computer software can allow a comparison to be made with the results from previous scans by means of a graphical display and provide a hard copy of all results.

The control station can provide docking and battery recharging facilities. The platform 7 can be designed on a modular basis to enable ease of removal and replacement of equipment for renewal and maintenance.

In addition, other features or facilities can be added to the platform 7. For example, pond desludging is possible by trailing a suction pipe from the platform 7 along the pond floor and circulating the water 5 through a filter. Such an arrangement could be incorporated in the platform propulsion system.

Pond skimming is possible by using the length of the hull of the platform 7 for a submerged weir whereby the surface of the pond water 5 is pulled by suction into a treatment system prior to returning the water 5 to the pond.

Further, means (not shown) can be provided on the platform 7 for checking and correcting the ullage on MEB's 4 and for taking samples, both liquid and gas, from the MEB's 4.

I claim:

1. Apparatus for locating a floatable platform relative to an article submerged in a liquid, the improvement comprising support members arranged to be adjacent to the article, extendible members depending from the platform, the extendible members being locatable on the support members such that appropriate extension of the extendible members raises the platform from a buoyant to a partially-buoyant state, means for determining the position of the platform relative to the article, inspection means for inspecting the article, and a leg on which the inspection means is mounted, the leg being supported from the platform and being capable of extending below the platform.

2. Apparatus as claimed in claim 1, including a carriage from which the extendible leg is supported, first guide means, the carriage being located on and movable on the first guide means, and second guide means, the first guide means being located on and movable on the second guide means, the second guide means being disposed on the platform and aligned in a direction normal to the first guide means, thereby to provide x-y scanning of the inspection means relative to the article.

3. Apparatus as claimed in claim 1, wherein the support members are incorporated in a rack in which the article is locatable.

4. Apparatus as claimed in claim 3, wherein the extendible members have outwardly divergent conical lower ends and the support members have relieved upper ends.

5. Apparatus as claimed in claim 3, including radio means for linking the platform to a remote control station.

6. Apparatus as claimed in claim 1, including propulsion means on the platform, the propulsion means comprising a plurality of jets for ejecting the liquid therefrom below the surface of the liquid, and movable deflector means for deflecting the ejected liquid in a required direction so as to provide manoeuvrability of the platform.

7. Apparatus for locating a floatable platform relative to an article submerged in a liquid, the improvement comprising support members arranged to be adjacent to the article, extendible members depending from the platform, the extendible members being locatable on the support members such that appropriate extension of the extendible members raises the platform from a buoyant to a partially-buoyant state, means for determining the position of the platform relative to the article, the position determining means comprising laser means on the platform arranged to scan stationary coded targets remote from the platform, and a rack in which the support members are incorporated and in which rack the article is locatable.

8. Apparatus for locating a floatable platform relative to an article submerged in a liquid, the improvement comprising support members arranged to be adjacent to the article, extendible members depending from the platform, the extendible members being locatable on the support members such that appropriate extension of the extendible members raises the platform from a buoyant to a partially-buoyant state, means for determining the position of the platform relative to the article, a rack in which the support members are incorporated and in which rack the article is locatable, the article comprising a container for irradiated nuclear fuel.

* * * * *